US010579812B2

(12) United States Patent
Corazza

(10) Patent No.: US 10,579,812 B2
(45) Date of Patent: Mar. 3, 2020

(54) 3D DIGITAL CONTENT INTERACTION AND CONTROL

(71) Applicant: Adobe Inc., San Jose, CA (US)

(72) Inventor: Stefano K. Corazza, Richmond, CA (US)

(73) Assignee: Adobe Inc., San Jose, CA (US)

( * ) Notice: Subject to any disclaimer, the term of this patent is extended or adjusted under 35 U.S.C. 154(b) by 159 days.

(21) Appl. No.: 15/221,134

(22) Filed: Jul. 27, 2016

(65) Prior Publication Data
US 2017/0243022 A1 Aug. 24, 2017

Related U.S. Application Data

(60) Provisional application No. 62/297,607, filed on Feb. 19, 2016.

(51) Int. Cl.
*G06F 21/62* (2013.01)
*G06F 3/0481* (2013.01)
(Continued)

(52) U.S. Cl.
CPC ...... *G06F 21/6218* (2013.01); *G06F 3/04815* (2013.01); *G06F 3/04847* (2013.01);
(Continued)

(58) Field of Classification Search
CPC .......... G06F 21/6218; G06F 3/04815; G06F 3/04847; G06T 19/20; G06T 19/003; G06T 15/06; G06T 2200/24
See application file for complete search history.

(56) References Cited

U.S. PATENT DOCUMENTS

2007/0196030 A1* 8/2007 Grimaud ................. G06T 17/00
382/276
2009/0128562 A1* 5/2009 McCombe ............. G06T 15/06
345/427

(Continued)

FOREIGN PATENT DOCUMENTS

WO WO-9853428 11/1998

OTHER PUBLICATIONS

"Combined Search and Examination Report", GB Application No. 1621608.7, Jun. 8, 2017, dated 6 pages.

*Primary Examiner* — Cheng-Feng Huang
(74) *Attorney, Agent, or Firm* — SBMC

(57) ABSTRACT

Three dimensional digital content interaction and control techniques are described. A digital medium environment is configured to protect against unauthorized access to three-dimensional digital content. One or more inputs are received involving user selection of one or more parameters of user interactive features to change an appearance of the three-dimensional digital content. A plurality of images is rendered from the three-dimensional digital content. The rendered plurality of images has a difference in the one or more parameters, one to another. A control is associated that supports user interaction to navigate through the plurality of images based on the difference in the one or more parameters. Distribution is controlled of the plurality of images and the associated control for consumption including navigation through the plurality of images using the associated control for the one or more parameters of the user interactive features.

17 Claims, 6 Drawing Sheets

(51) Int. Cl.
*G06F 3/0484* (2013.01)
*G06T 15/06* (2011.01)
*G06T 19/00* (2011.01)
*G06T 19/20* (2011.01)

(52) U.S. Cl.
CPC ............ *G06T 15/06* (2013.01); *G06T 19/003* (2013.01); *G06T 19/20* (2013.01); *G06T 2200/24* (2013.01)

(56) References Cited

U.S. PATENT DOCUMENTS

| | | | |
|---|---|---|---|
| 2009/0322752 A1* | 12/2009 | Peterson | G06T 15/06 345/426 |
| 2012/0200568 A1 | 8/2012 | Gossweiler et al. | |
| 2013/0069970 A1* | 3/2013 | Sasaki | G06T 15/06 345/589 |
| 2014/0237495 A1* | 8/2014 | Jang | H04N 21/44218 725/12 |
| 2015/0049011 A1* | 2/2015 | Mankowski | G06F 3/01 345/156 |
| 2015/0123971 A1* | 5/2015 | Lee | G06T 15/06 345/426 |

\* cited by examiner

3D DIGITAL CONTENT INTERACTION AND CONTROL

RELATED APPLICATIONS

This Application claims priority to U.S. Provisional Patent Application No. 62/297,607, filed Feb. 19, 2016, and titled "3D Digital Content Interaction and Control," the disclosure of which is incorporated by reference in its entirety.

BACKGROUND

Three-dimensional digital content may be configured in a variety of ways to support a variety of features. In one example, three-dimensional digital content is used to model a scene having a plurality of objects. A user is then able to interact with the content to change parameters in order to achieve different two-dimensional views of the content. Examples of changes in parameters are usable to achieve these different views include a change in viewpoints of the scene, change in lighting, colors, and so forth. In this way, a user may readily obtain a desired two-dimensional view through interaction with these parameters without having to manually redraw this view.

However, conventional formats used to support three-dimensional digital content are readily compromised by malicious parties. For example, even a user having basic computer skills is able to download and use conventional three-dimensional digital content when exposed via a network, e.g., to download the content when implemented using a dynamic runtime language. Accordingly, conventional techniques have been developed to protect the three-dimensional content from being compromised. These conventional techniques, however, involve generating one or more two-dimensional views of the three-dimensional digital content. Although this protects the three-dimensional digital content from compromise, e.g., from access to a mesh, texture, or polygons used to form the content, a user is limited to these views and does not support user interaction. Accordingly, the user is not able to change the parameters in order to achieve different desired views in order to determine whether a desired view or interaction is supported by the content. This limits a user's awareness of which parameters are supported by the content, thereby limiting the user's interaction and defeating a very purpose of creating this content in three dimensions.

SUMMARY

Three dimensional digital content interaction and control techniques are described. A digital medium environment is configured to protect against unauthorized access to three-dimensional digital content. One or more inputs are received involving user selection of one or more parameters of user interactive features to change an appearance of the three-dimensional digital content. A plurality of images is rendered from the three-dimensional digital content. The rendered plurality of images has a difference in the one or more parameters, one to another. A control is associated that supports user interaction to navigate through the plurality of images based on the difference in the one or more parameters. Distribution is controlled of the plurality of images and the associated control for consumption including navigation through the plurality of images using the associated control for the one or more parameters of the user interactive features.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
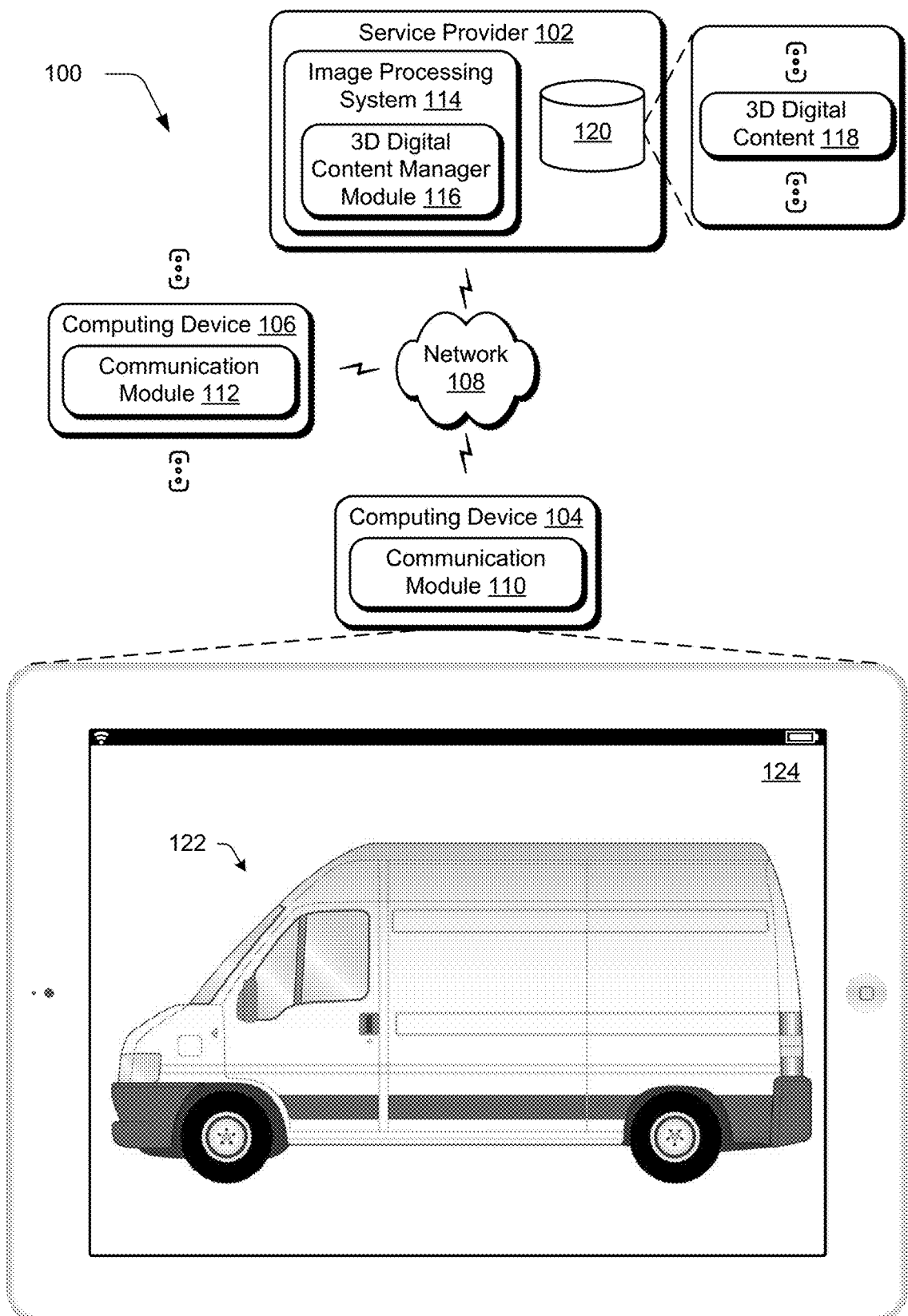
FIG. 1 is an illustration of an environment in an example implementation operable to employ three dimensional digital content interaction and control techniques described herein.

Conventional techniques used to create three dimensional digital content supporting user interaction (e.g., changes in views) are readily compromised by malicious parties when this content is exposed. Although conventional techniques have been developed to protect against compromise, these conventional techniques generate two-dimensional views of the content that do not support user interaction. Accordingly, an artist that creates the digital content is forced to choose between "all or nothing" options in which a user may interact with the content but the content is readily compromised or forgo support of this interaction but the content is protected.

Accordingly, three dimensional digital content interaction and control techniques and systems are described. In an example, three dimensional digital content is created by a user. For example, a user may interact with tools provided locally or remotely via a network to generate the three-dimensional digital content as a mesh, over which, a texture is formed, generated as a plurality of polygons, and so forth. As part of this creation, the user may also specify parameters that are changeable transform an appearance of the three dimensional digital content. Examples of parameters include orientation, depth of field, color intensity, direction of light, position of a viewer, lens parameters, filters, color correction, and so forth. In this way, user interaction is supported to change an appearance of the three-dimensional digital content.

Once created, the three dimensional digital content is processed for exposure to form a version protected from compromise from malicious parties yet still supporting user interaction. To do so, user inputs are received that specify parameters to be exposed that support user interaction. For example, the user may specify that horizontal views taken at forty-five degree increments are to be used as well as changes in direction of light along a vertical axis also at forty-five degree increments. Each combination of these parameters is then generated as a two-dimensional image, e.g., through use of ray tracing. For instance, a single front view of the three-dimensional digital content includes images rendered using each change in the direction of light along the vertical axis. This process is then repeated for each specified view to form a collection of two-dimensional images.

Compression techniques are then applied to these images to reduce an amount of bandwidth and memory used to transmit and store the images. The compression techniques, for instance, may be used to leverage similarities of the images, one to another, to reduce an amount of data in the images used to describe these similarities. In this way, efficiency in communication and storage of these images may be increased.

A control is also associated with the images to control navigation through the different views according to a respective parameter. Continuing with the previous example, the control may be used to change the direction of light along the vertical axis to cause corresponding images showing that direction to be displayed in a user interface. Another control may also be used to change the horizontal views in a similar manner In this way, user interaction with the views taken from the three dimensional digital content is preserved in a manner similar to how interaction is performed with the three-dimensional digital content, itself. This also functions to protect the three dimensional digital content from compromise from malicious parties as underlying functionality used to generate the three dimensional digital content (e.g., meshes, textures, and polygons) is not accessible to the malicious parties through these images. Further description of these and other examples are included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation operable to employ three dimensional digital content interaction and control techniques described herein. The illustrated environment 100 includes a service provider 102, a computing device 104, and another computing device 106 that are communicatively coupled, one to another, via a network 108. The computing devices 104, 106 as well as computing devices that implement the service provider 102 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, the computing device may be representative of a plurality of different devices, such as multiple servers utilized by a business to perform operations "over the cloud" for the service provider 102 as further described in relation to FIG. 6.

In this example, computing devices 104, 106 each include respective communication modules 110, 112 that are representative of functionality to interact with an image processing system 114 of the service provider 102 via the network 108. Accordingly, the communication modules 110, 112 may be implemented in a variety of ways, such as a browser or network-enabled application executed by respective ones of the computing devices 104, 106. Although functionality of the image processing system 114 is described in the following as being implemented via a web service, this functionality may also be implemented locally by respective ones of the computing devices 104, 106.

An example of functionality of the image processing system 114 is illustrated as a 3D digital content manager module 116. The 3D digital content manager module 116 is implemented at least partially in hardware (e.g., through a processing system, computer-readable storage media, integrated circuits, and so on as described in relation to FIG. 6) to manage creation and exposure of 3D digital content 118, which is illustrated as stored in storage 120. 3D digital content 118 may be configured as a variety of ways, such as a three-dimensional model formed using geometric data (e.g., meshes and textures, polygons), which may then be rendered as a two dimensional image 122 in a user interface 124. The 3D digital content 118, for instance, may represent a physical object, such as a van as illustrated, as a collection of points in three dimensional space connected by various geometric entities, such as triangles, lines, curved surface, and so on. Typically, user interaction with the 3D digital content 118 is supported, such as to change a location, at which, a user views the image.

As previously described, conventional techniques used to generate and maintain 3D digital content 118 are easily compromised, even by users having basic computer skills. For example, a user of computing device 104 may interact with the service provider 102 and create and expose 3D digital content 118 for purchase by other users, such as a user of computing device 106 via a stock content website. Conventionally, users wishing to market 3D digital content 118 using conventional techniques are forced to choose between exposing this content in a manner that is easily compromised to provide two-dimensional images captured from this content that did not support user interaction. However, techniques are described in the following in which the 3D digital content manager module 116 forms a version of the 3D digital content 118 that is safe from compromise by malicious parties and yet supports user interaction, an example of which is described in greater detail in the following.

Figure 2:
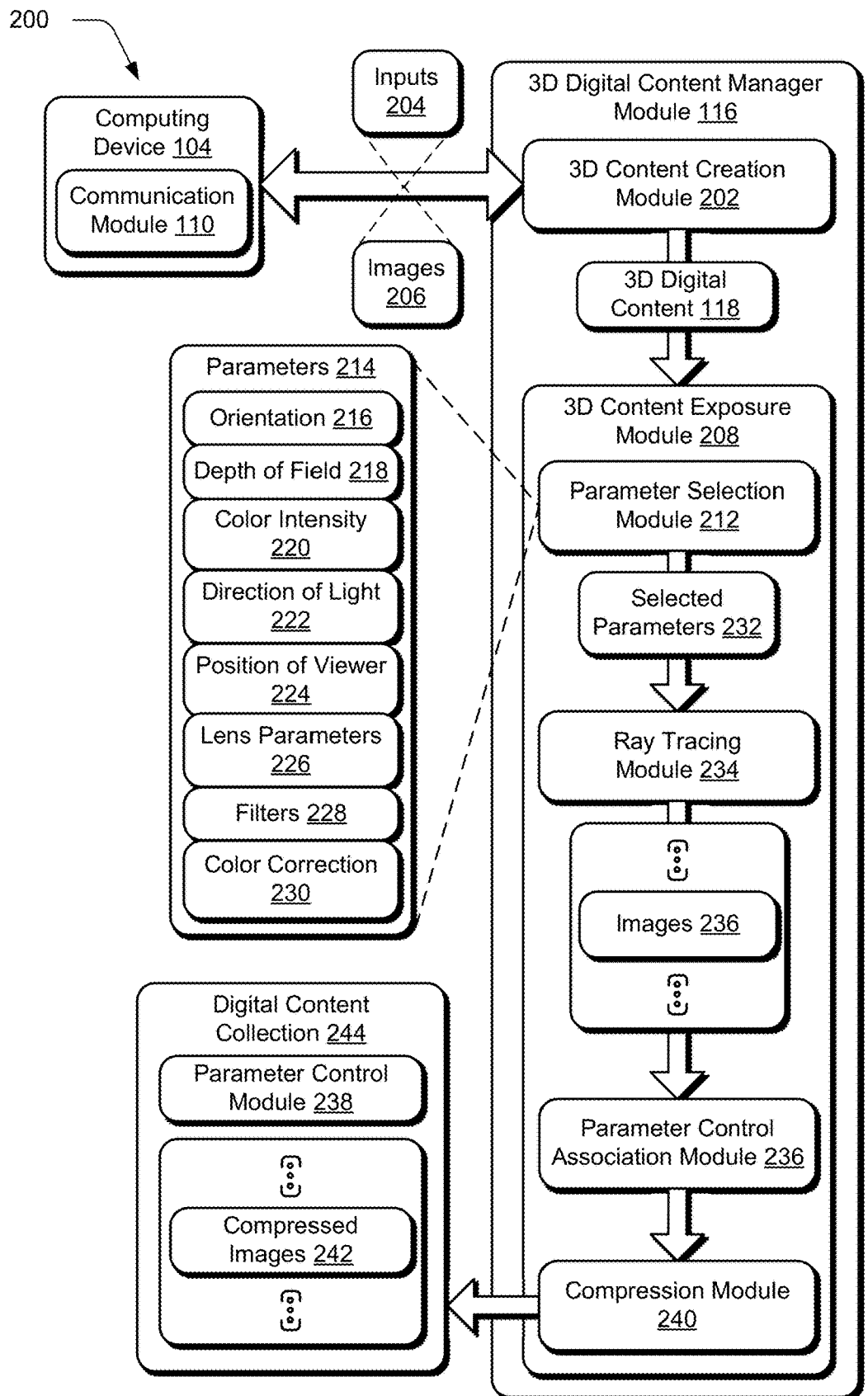
FIG. 2 depicts a system in an example implementation showing operation of a 3D digital content manager module of FIG. 1 in greater detail.

FIG. 2 depicts a system 200 in an example implementation showing operation of the 3D digital content manager module 116 of FIG. 1 in greater detail. To start, a user of computing device 104 interacts with the 3D digital content manager module 202 in this example via the network 108 to create 3D digital content 118. The 3D digital content manager module 116, for instance, includes a 3D content creation module 202 that is representative of functionality implemented at least partially in hardware to provide tools to form a 3D model of one or more objects. These tools may be used to define a three-dimensional mesh, over which, a texture is applied to form the model. In another example, the tools may be used to form a collection of polygons having textures to form the model.

Regardless of how modeled, a user of the computing device 104 provides inputs 204 to the 3D content creation module 202 to specify how the 3D digital content 118 is to be created. These inputs 204 are then used by the 3D content creation module 202 to form a model and render images 206 for viewing in a user interface of the computing device 104 as part of this creation, e.g., to manipulate a mesh over which the texture is formed. This may be performed remotely through configuration of the 3D digital content manger module 116 as part of a web service (e.g., by service provider 102) or locally on the computing devices 104 itself, in whole or in part.

Once the 3D digital content 118 is created, a user option is provided in a user interface by the 3D content creation module 202 to form a version of the 3D digital content 118 that is protected from malicious parties and yet still supports user interaction. Functionality to do so is represented by a 3D content exposure module 208, which is implemented at least partially in hardware as logic to form images from the 3D digital content 118 and associate a control supporting user interaction with those images.

A parameter selection module 212 is first employed to output an option to support user selection of parameters 214 to be used as a basis of user interaction with the content. Parameters 214 in this example describe user controllable differences as part of user interaction to transform an appearance of the 3D digital content 118, which may be defined in a variety of ways. In a first such example, orientation 216 is usable to change a position of objects of the 3D digital content 118 within three-dimensional space. In another example, depth of field 218 used to describe a depth of focus within the three-dimensional space defined by the 3D digital content 118, i.e., to focus as different distances form a user viewing the space. In yet another example, color intensity 220 is usable to change intensity of color of objects and surroundings of the objects as part of the 3D digital content. In a further example, a direction of light 222 parameter is usable to specify one or more directions of light as part of an environment that includes objects, such as to specify placement of one or more virtual light sources to define a corresponding direction of shadows formed in the environment.

A user, through interaction with the parameter selection module 212 specifies selected parameters 232 that are to be used as a basis of user interaction as well as differences in how those parameters are to be used. For the position of the view 224 parameter, for instance, the user may specify 90 degree increments along a horizontal plane to mimic a user walking around the van of FIG. 1. In this way, a creator of the 3D digital content 118 may specify selected parameters 232 that are to be used as a basis for user interaction with a protected version of the content and also define how that interaction is to occur.

Next, images are rendered from the 3D digital content 118 based on the selected parameters 232. The 3D content exposure module 208, for instance, may employ a ray tracing module 242 that is representative of functionality implemented as least partially in hardware to render images 236 using ray tracing.

Figure 3:
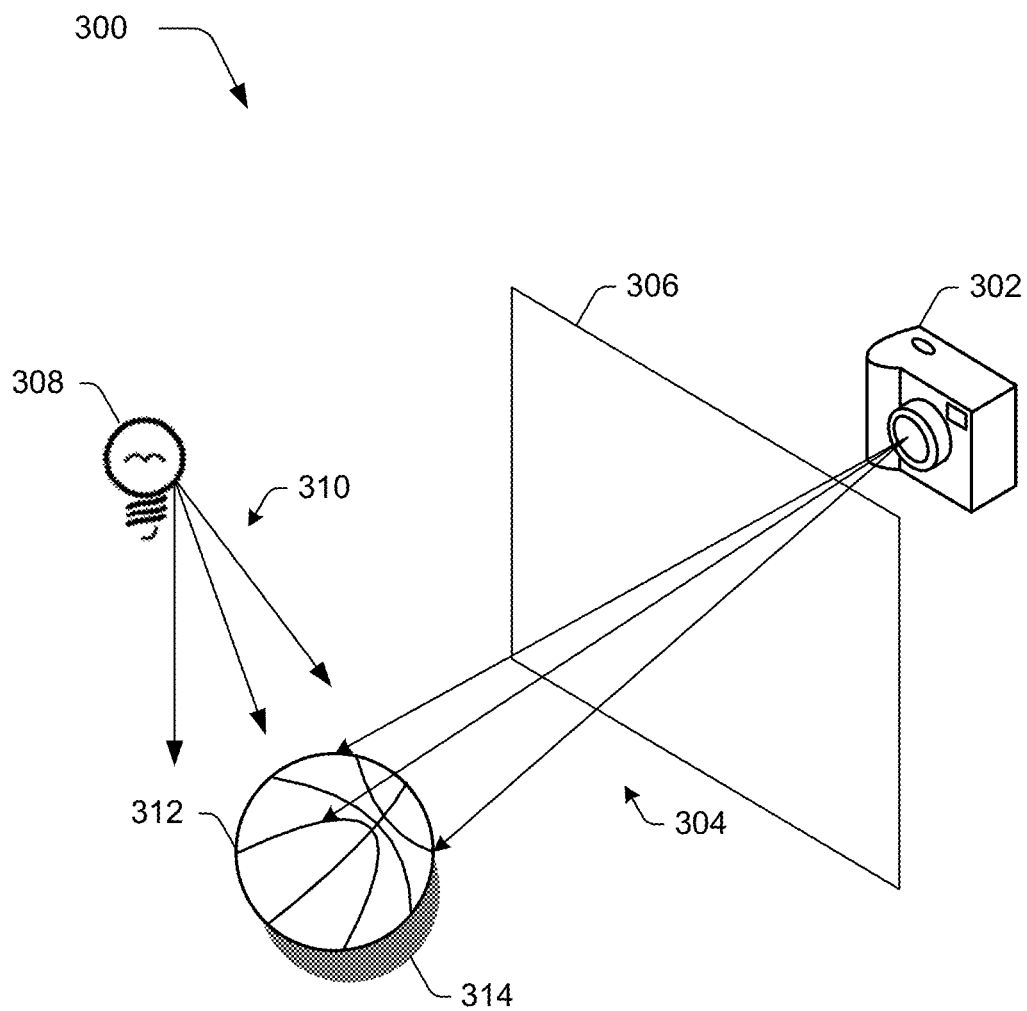
FIG. 3 depicts an example implementation of ray tracing that is usable to form images of FIG. 2. p

FIG. 3 depicts an example implementation 300 of ray tracing that is usable to form the images 236. Ray tracing is a technique in which an effect of a ray of light in an environment of the 3D digital content 118 is traced, including absorption and reflection of the ray of light off objects within the environment. For example, ray tracing involves tracing a path 304 from an imaginary camera 302 through each pixel in a virtual viewing plane 306, and calculating a color of an object from the scene that is viewable through it. As illustrated, a virtual light source 308 may be positioned within the environment as a source of light rays that intersect an object 312. The ray tracing module 242 may calculate material properties of the object to determine how light is reflected off the object for viewing by the camera 302. Through tracing and processing of these individual light rays, realistic effects may be supported, such as inclusion of shadows 314 within a scene modeled by the three-dimensional digital content 118. Other techniques may also be used to render the images 236 from the 3D digital content 118, such as ray casting, scanline rendering, or other image rendering techniques to generate two-dimensional images.

Returning now again to FIG. 2, a parameter control association module 236 implemented at least partially in hardware is then employed by the 3D content exposure module 208 to associate a parameter control module 238 with the images 238 to support user interaction based on the selected parameters 232. A control implemented by the parameter control module 238, for instance, may be used to navigate between specified differences in the selected parameters 232 that served as a basis for generation of the images 236. In the example of position of viewer 224, for instance, the control may be used to navigate through ninety degree views along a horizontal plane, e.g., through use of a slide, by "grabbing" a portion of the image using a cursor control device, and so on. In this way, the parameter control module 238 supports user interaction with the images 236. As such, the images 236 and supported user interaction may be referred to as a "2.5" dimensional version of the 3D digital content 118 that lies between a three dimensional version supporting full user interaction and a two dimensional version that does not support user interaction.

A compression module 240 may also be employed by the 3D content exposure module 208 to promote efficient communication and storage of the images 236. In the previous examples, it was described that the addition of each selected parameter results in generation of at least one additional set of images that have defined differences in that parameter. Accordingly, a multitude of images 236 may be created to support user interaction. To reduce an amount of bandwidth to communicate and store the images 236, the compression module 240 employs one or more compression techniques (e.g., H.264) to leverage similarities in the images 236, one to another, to compress the images to formed the compressed images 242.

The 3D content exposure module 208 may then expose the compressed images 242 and associated parameter control module 238 as a digital content collection 244 for consumption, e.g., by a user of computing device 106. The 3D content exposure module 208, for instance, may expose the digital content collection 244 as part of a stock content service for interaction by users. Users, interacting with the digital content collection 244, may make changes to the selected parameters and as such the digital content collection 244 supports dynamic user interaction. The compressed images 242, on the other hand, protect the content from compromise by malicious parties because these malicious parties are not able to access underlying 3D functionality of the 3D digital content 118, e.g., meshes, textures, polygons, and so forth. The service provider 102 may then provide the actual 3D digital content 118 to a user based on the interaction, e.g., for purchase. Thus, user interaction supported by the techniques described herein are usable to increase a likelihood of purchase of corresponding 3D digital content 118 yet still protecting this content.

Figure 4:
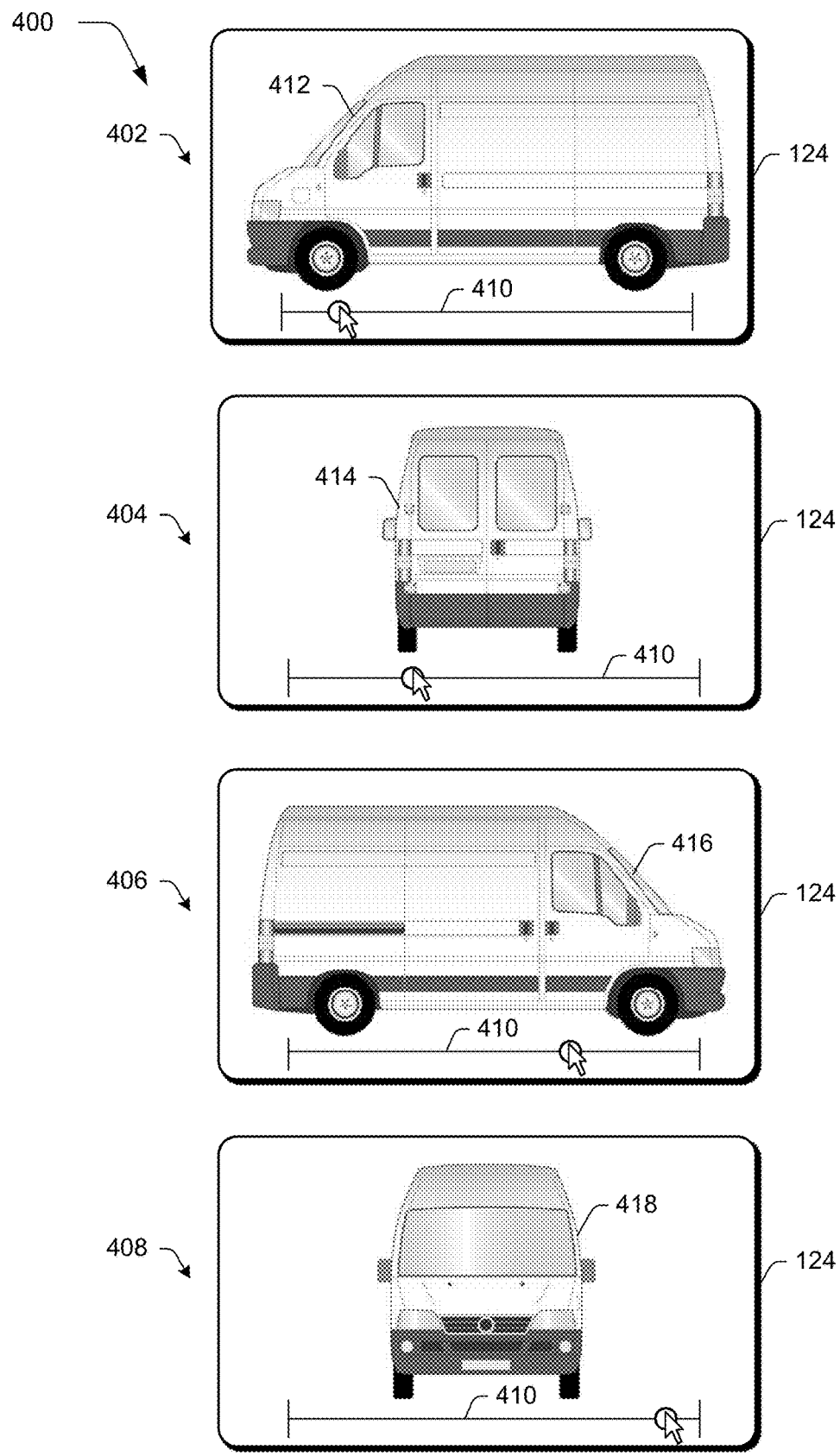
FIG. 4 depicts an example of user interaction with a digital content collection of FIG. 2.

FIG. 4 depicts an example 400 of user interaction with the digital content collection 244 of FIG. 2. This example 400 is illustrated using first, second, third, and fourth stages 402, 404, 406, 408 in a user interface 124. In this example, a digital content collection 244 includes a plurality of compressed images 242 and an embedded parameter control module 238. The embedded parameter control module 238 is executed to output a control 410 that supports user interaction to navigate through differences in a selected parameter 232, which is position of a view 224 at ninety degree increments along a horizontal plane in this instance. The control 410 is illustrated as a slide in this instance, and other configurations are also contemplated, such as a "grab and drag" control, support of gestures, voice commands, and so on.

At the first stage 402, the control 410 is positioned to render an image 412 of a left side view of an object, which is a van in this instance. User interaction is then detected via a cursor control device to move the control, which causes output of a difference in the selected parameter. In response, an image corresponding to this difference is output, which is an image 414 of a rear view of the view at the second stage 404. This navigation continues through the third and fourth stages 406, 408 to show respective right side views 416 and front views 418 of the van. In this way, a user is able to interact with the images to "walk around" the van using the selected parameter and yet 3D functionality used to create the images is protected from compromise by malicious parties.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
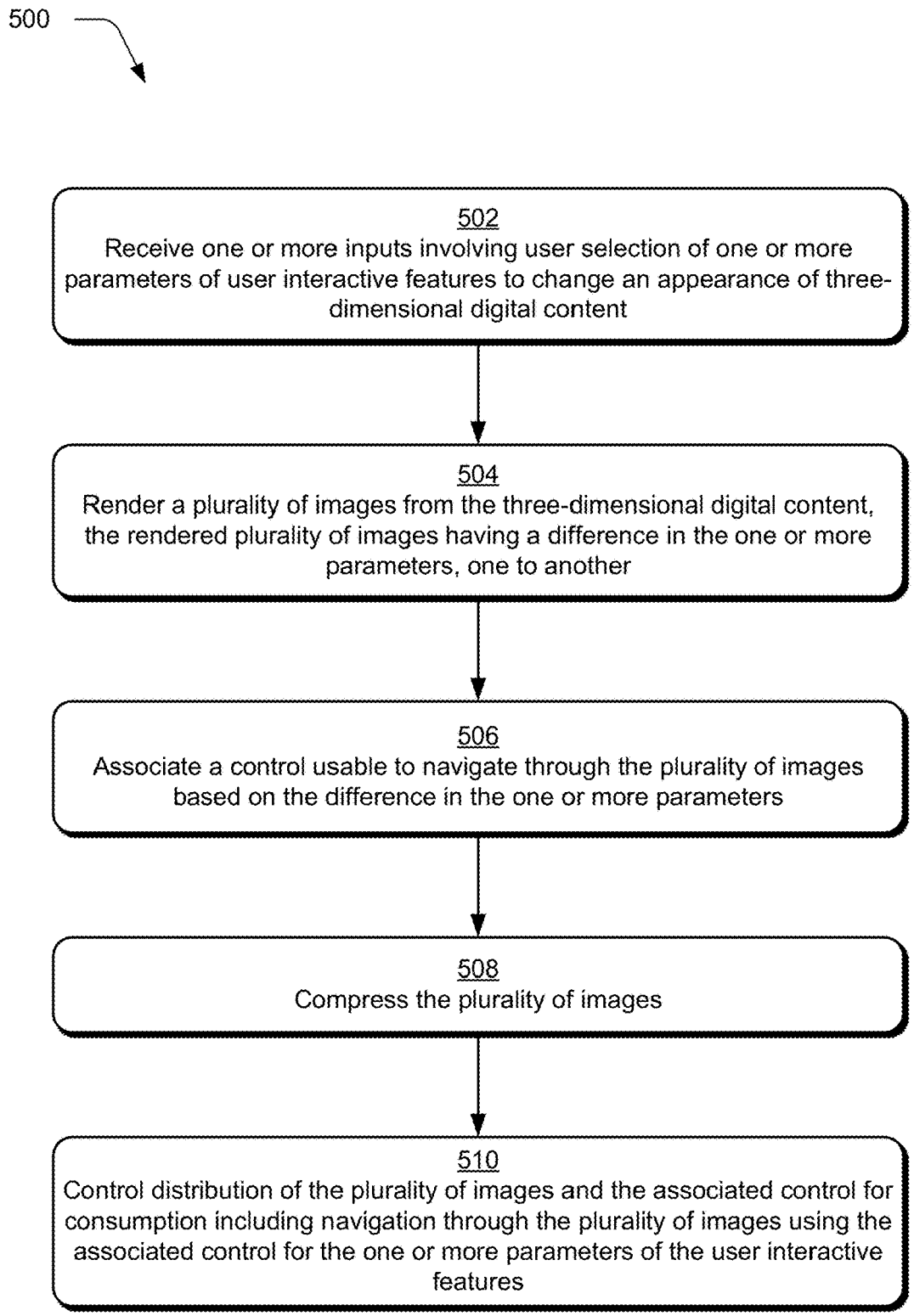
FIG. 5 is a flow diagram depicting a procedure in an example implementation in which a digital medium environment is configured to protect against unauthorized access to three-dimensional digital content.

FIG. 5 depicts a procedure 500 in an example implementation in which a digital medium environment is configured to protect against unauthorized access to three-dimensional digital content. One or more inputs are received involving user selection of one or more parameters of user interactive features to change an appearance of the three-dimensional digital content (block 502). A user, for instance, may select from a plurality of preconfigured options of parameters that are usable to transform an appearance of 3D digital content. Examples of parameters include orientation, depth of field, color intensity, direction of light, position of viewer, lens parameters, filters, or color correction. The one or more inputs may also specify differences to be used for the parameters, such as to increment by ninety degrees for orientation, different amounts of color intensity, locations of the direction of light, and so forth.

A plurality of images is rendered from the three-dimensional digital content. The rendered plurality of images has a difference in the one or more parameters, one to another (block 504). Continuing with the previous example, the ray tracing module 234 may render images 236 based on the select parameters 232 and differences in those parameters.

Other versions of these images may also be rendered, such as to support different resolutions, fidelity, or interaction level (e.g., cursor versus touch screen) to correspond to differences in functionality available from computing devices that are to consume the images.

A control is associated that supports user interaction to navigate through the plurality of images based on the difference in the one or more parameters (block 506). The control, for instance, may be embedded using a parameter control module 128 and used to increment through the differences sequentially, such as through use of a slider. Interpolation techniques may also be employed to generate additional versions of the images disposed between these different images, such as to generate forty-five degree views, other differences in color, depth of field, and so forth.

The plurality of images is compressed (block 508). Compression may be performed in a variety of ways, such as to use H.264 or other image compression technique.

Distribution is controlled of the plurality of images and the associated control for consumption including navigation through the plurality of images using the associated control for the one or more parameters of the user interactive features (block 510). The 3D content exposure module 208, for instance, may configure a digital content collection 244 for use by a creator of the 3D digital content to protect against malicious parties. Other examples are also contemplated, such as to publish the content via a stock content service. Additionally, control of distribution may include locating and providing versions of the digital content collection 244 that correspond to functionality of a device requesting access, such as for particular resolutions, fidelity, or interaction levels.

Example System and Device

Figure 6:
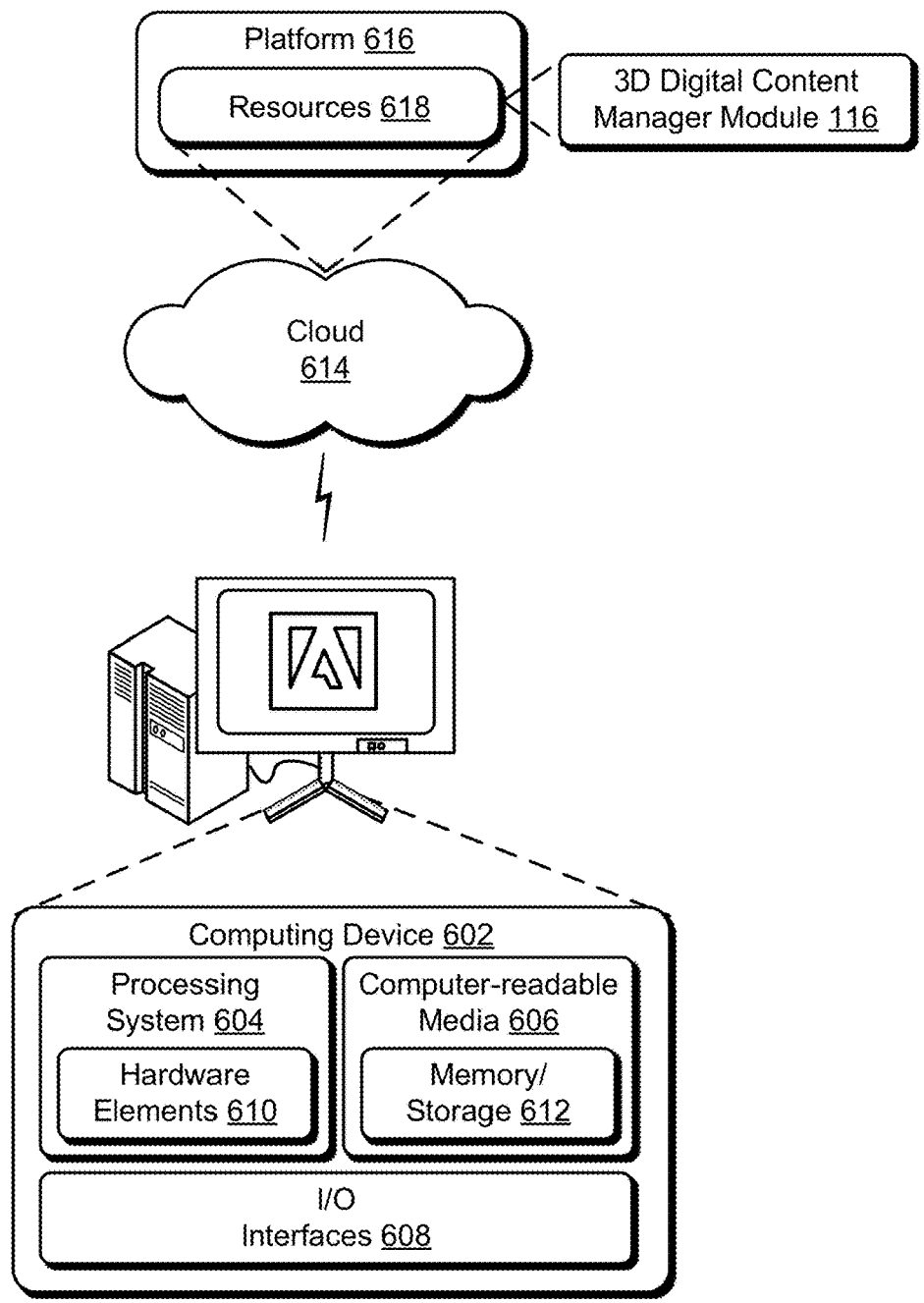
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the 3D digital content manager module 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to protect against unauthorized access to three-dimensional digital content, a method implemented by a computing device, the method comprising:
   receiving, by the computing device, a user selection of:
      at least two parameters from a plurality of parameters, the at least two parameters including orientation and at least one other parameter in addition to the orientation; and
      an increment specifying an amount of change to an appearance of the three-dimensional digital content based on the selected parameter;
   rendering, by the computing device, a plurality of images in two-dimensions from the three-dimensional digital content using a single viewpoint with respect to the three-dimensional digital content, the plurality of images having a difference in the parameter based on the increment, one to another;
   associating, by the computing device, the plurality of images in two-dimensions with a respective portion of a plurality of portions of a control configured as a slider, the control supporting user interaction to navigate through the plurality of images based on the increment in the parameter; and
   generating, by the computing device, a digital content package including the rendered plurality of images in two-dimensions and the control.

2. The method as described in claim 1, wherein the rendering includes ray tracing of the three-dimensional digital content to generate the plurality of images in two-dimensions.

3. The method as described in claim 1, further comprising compressing the plurality of images in two-dimensions by the computing device.

4. The method as described in claim 1, wherein the plurality of images in two-dimensions, as rendered, do not include a mesh and texture of the three-dimensional digital content.

5. The method as described in claim 1, wherein the plurality of images in two-dimensions, as rendered, do not include polygons of the three-dimensional digital content.

6. The method as described in claim 1, wherein the rendering of the plurality of images in two-dimensions includes rendering the plurality of images to have different ones of resolution, fidelity, or interactive level of the associated control.

7. The method as described in claim 6, wherein the controlling includes determining at least one of resolution, fidelity, or interaction level supported by a computing device requesting access to the plurality of images in two-dimensions and distributing corresponding said images to the requesting computing device.

8. The method as described in claim 1, wherein the receiving includes receiving the user selection via a network at the computing device as implementing a web service by a service provider.

9. In a digital medium environment to protect against unauthorized access to three-dimensional digital content, a system comprising:
   a parameter selection module implemented at least partially in hardware including a processing system and a computer-readable storage medium to receive a user selection of:
      at least two parameters from a plurality of parameters, the at least two parameters including orientation and at least one other parameter in addition to the orientation; and
      an increment specifying an amount of change to an appearance of the three-dimensional digital content based on the selected parameter;
   a ray tracing module implemented at least partially in hardware including the processing system and the computer-readable storage medium to render, using ray tracing, a plurality of images in two-dimensions from the three-dimensional digital content from a single viewpoint with respect to the three-dimensional digital content, the plurality of images having a difference in the parameter based on the increment, one to another;
   a parameter control associated module implemented at least partially in hardware including the processing system and the computer-readable storage medium to associate a control with the plurality of images in two-dimensions with a respective portion of a plurality of portions of the control, the control supporting user interaction to navigate through the plurality of images based on the increment in the parameter; and
   a three dimensional content creation module implemented at least partially in hardware including the processing system and the computer-readable storage medium to generate a digital content package including the rendered plurality of images in two-dimensions and the associated control.

10. The system as described in claim 9, further comprising a compression module implemented at least partially in hardware including the processing system and the computer-readable storage medium to compress the plurality of images in two-dimensions.

11. The system as described in claim 9, wherein the ray tracing module is configured to render the plurality of images in two-dimensions to include different ones of resolution, fidelity, or interactive level of the associated control.

12. The system as described in claim 11, further-comprising a three dimensional content exposure module implemented at least partially in hardware including the processing system and the computer-readable storage medium to determine at least one of resolution, fidelity, or interactive level supported by a computing device requesting access to the plurality of images in two-dimensions and distribute corresponding said images to the requesting computing device.

13. The system as described in claim 9, wherein the parameter selection module is configured to receive the user selection via a network as implementing a web service of a service provider.

14. In a digital medium environment to protect against unauthorized access to three-dimensional digital content, one or more computing devices having a processing system and computer-readable storage media of a web service configured to perform operations comprising:
   receiving, by the one or more computing devices, a user selection of:
      at least two parameters from a plurality of parameters, the at least two parameters including orientation and at least one other parameter in addition to the orientation; and
      an increment specifying an amount of change to an appearance of three-dimensional digital content based on the selected parameter;
   rendering using ray tracing, by the one or more computing devices, a plurality of images in two-dimensions from the three-dimensional digital content using a single viewpoint with respect to the three-dimensional digital content, the plurality of images having a difference in the parameter based on the increment, one to another;
   compressing, by the one or more computing devices, the plurality of images in two-dimensions;
   associating, by the one or more computing devices, the plurality of images in two-dimensions with a respective portion of a plurality of portions of a control, the control supporting user interaction to navigate through the plurality of images in two-dimensions based on the increment in the parameter; and
   generating, by the computing device, a digital content package including the rendered plurality of images in two-dimensions and the associated control.

15. The one or more computing devices as described in claim 14, wherein the plurality of images in two-dimensions, as rendered, do not include a mesh and texture of the three-dimensional digital content and do not include polygons of the three-dimensional digital content.

16. The one or more computing devices as described in claim 14, wherein the rendering of the plurality of images in two-dimensions include rendering the plurality of images to have different ones of resolution, fidelity, or interactive level of the associated control.

17. The one or more computing devices as described in claim 16, wherein the exposing includes determining at least one of resolution, fidelity, or interactive level supported by a computing device requesting access to the plurality of images in two-dimensions and distributing corresponding said images to the requesting computing device.

* * * * *

UNITED STATES PATENT AND TRADEMARK OFFICE
CERTIFICATE OF CORRECTION

PATENT NO. : 10,579,812 B2
APPLICATION NO. : 15/221134
DATED : March 3, 2020
INVENTOR(S) : Stefano K. Corazza It is certified that error appears in the above-identified patent and that said Letters Patent is hereby corrected as shown below:

In the Claims

Column 12, Line 59, after "claim 11,", delete "further-comprising", insert -- further comprising --, therefor.

Signed and Sealed this
Twelfth Day of May, 2020

Andrei Iancu
*Director of the United States Patent and Trademark Office*